United States Patent [19]

Juvan

[11] 4,266,180
[45] May 5, 1981

[54] METHOD OF AND MEANS FOR HIGH PERFORMANCE DIRECT CURRENT ELECTRICAL PULSE GENERATION UTILIZING MECHANICAL ENERGY STORAGE

[75] Inventor: Christian H. A. Juvan, Cupertino, Calif.

[73] Assignee: ILC Technology, Inc., Sunnyvale, Calif.

[21] Appl. No.: 50,756

[22] Filed: Jun. 21, 1979

[51] Int. Cl.³ .................................. H02K 39/00
[52] U.S. Cl. .............................. 322/4; 290/1 R; 322/8; 322/100; 315/289; 318/161; 310/43; 310/74
[58] Field of Search .......... 290/1 R, 1 A, 1 B, 4 R, 290/4 B, 4 C, 49; 310/111, 168, 266, 43, 74; 322/4, 8, 9, 47, 49, 100; 315/289; 318/161

[56] References Cited

U.S. PATENT DOCUMENTS

| 1,456,955 | 5/1923 | Wagner. | |
|---|---|---|---|
| 2,147,381 | 2/1939 | List et al.. | |
| 3,500,078 | 3/1970 | Buser et al. | 290/1 R |
| 3,535,573 | 10/1970 | Appleton et al.. | |
| 4,200,831 | 4/1980 | Weldon et al. | 322/8 |

OTHER PUBLICATIONS

Aviation Week and Space Technology Oct. 2, 1978, U.S. Pushes For Beam Weapon Development By Clarence A. Robinson, Jr., pp. 14–22.

Lawrence Livermore Laboratories Brochure, Jul. 1978, Compensated Pulsed Alternator.

Primary Examiner—J. V. Truhe
Assistant Examiner—John W. Redman
Attorney, Agent, or Firm—Phillips, Moore, Weissenberger, Lempio & Majestic

[57] ABSTRACT

A method of converting inertial mechanical energy into a high energy direct current electrical pulse of short time duration is disclosed. Apparatus for practicing the method is described. According to the invention, a rotating mass is provided together with electrical conductor means for producing a localized magnetic field at the surface of the mass. A localized magnetic flux compression means is also provided at the surface of the mass and either the electrical conductor means or the flux compression means is rotated with the mass to produce periodic compression of the flux of the localized magnetic field in response to the rotation of the mass. A load is connected across the electrical conductor during such flux compression which converts a major portion of the inertial energy of the rotary mass into an exponentially rising pulse of direct current through the load with a very rapid decay.

41 Claims, 15 Drawing Figures

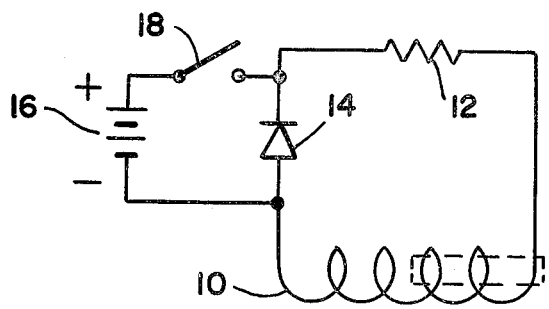
FIG_1
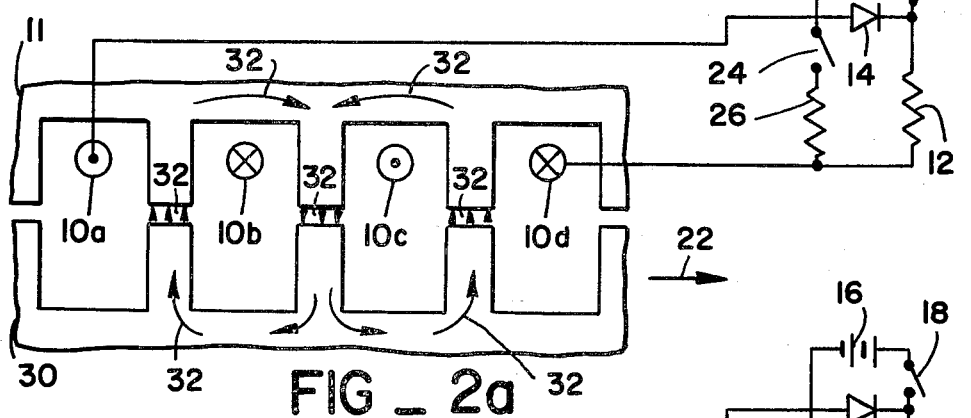
FIG_2a
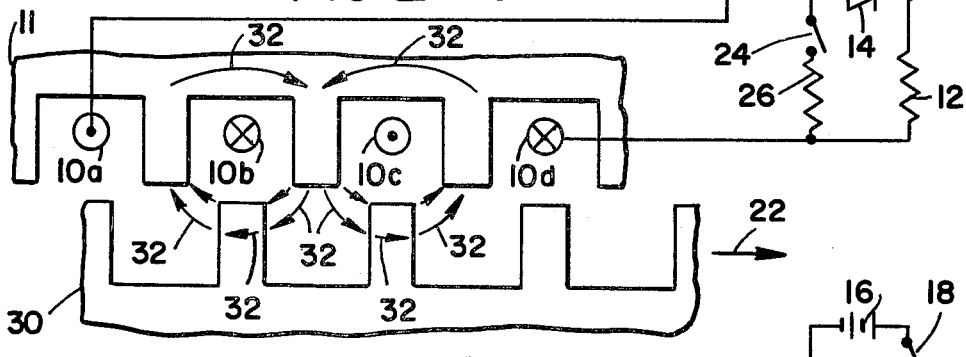
FIG_2b
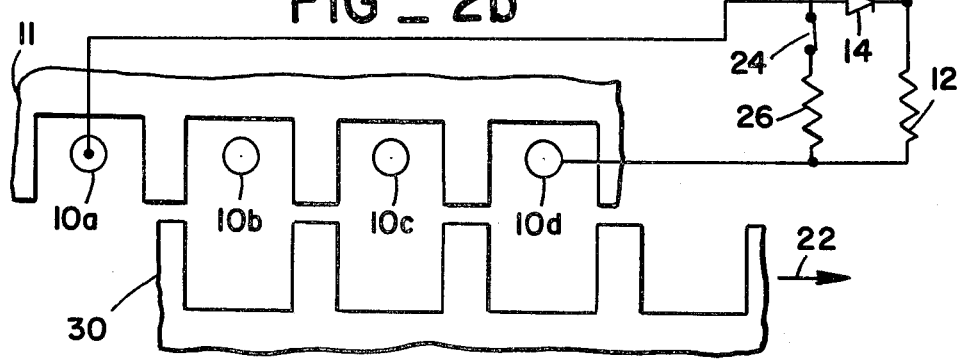
FIG_2c

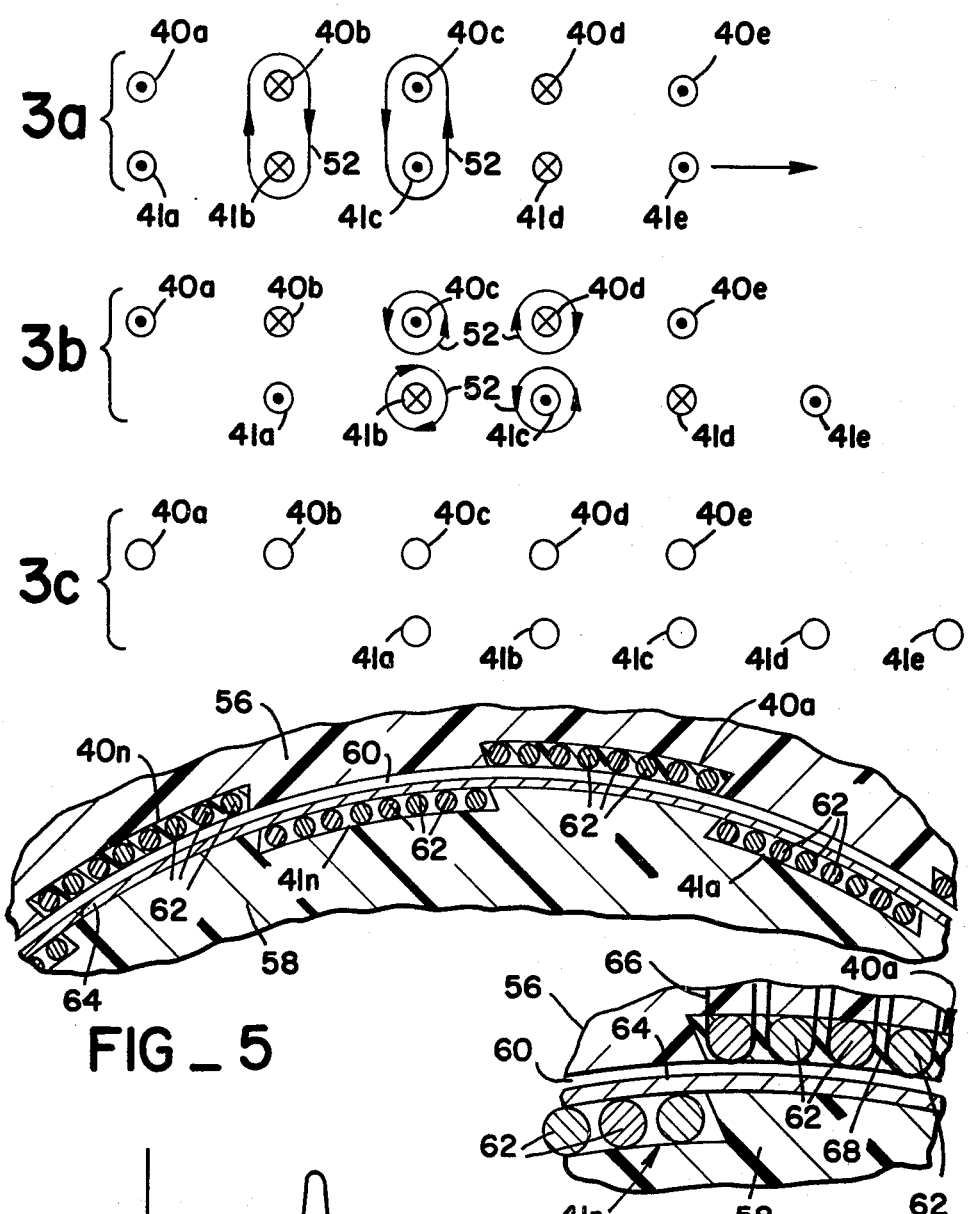
FIG_5
FIG_6
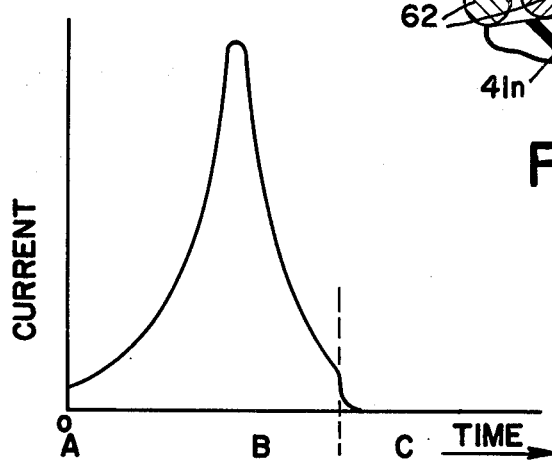
FIG_7

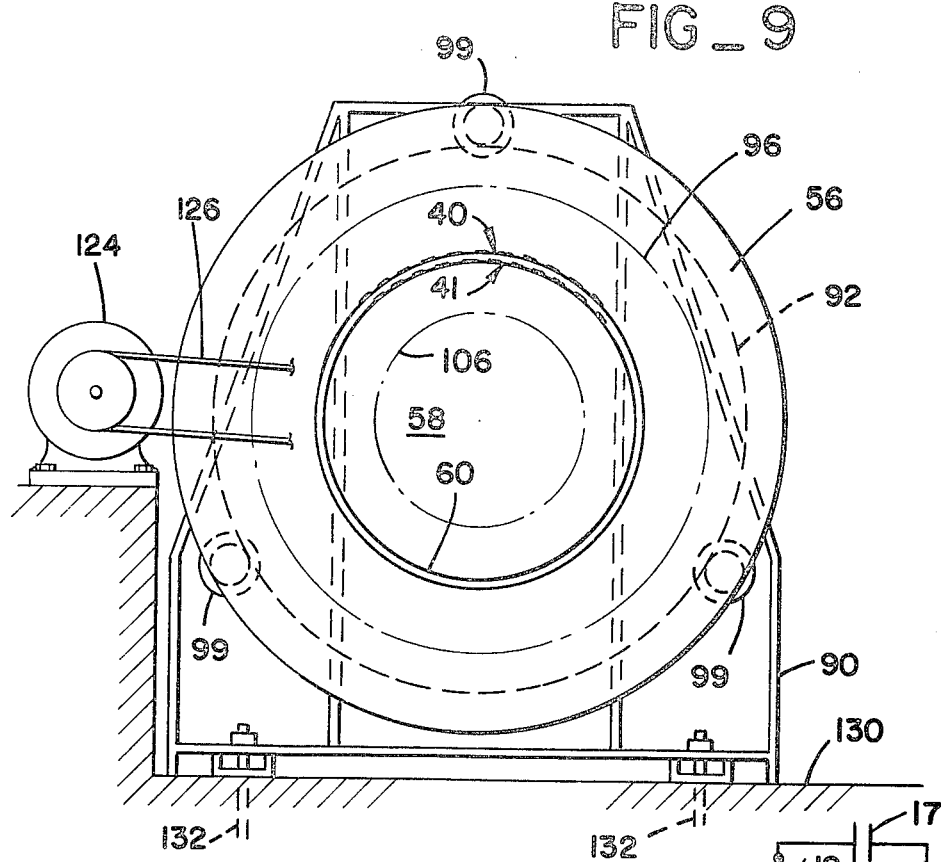
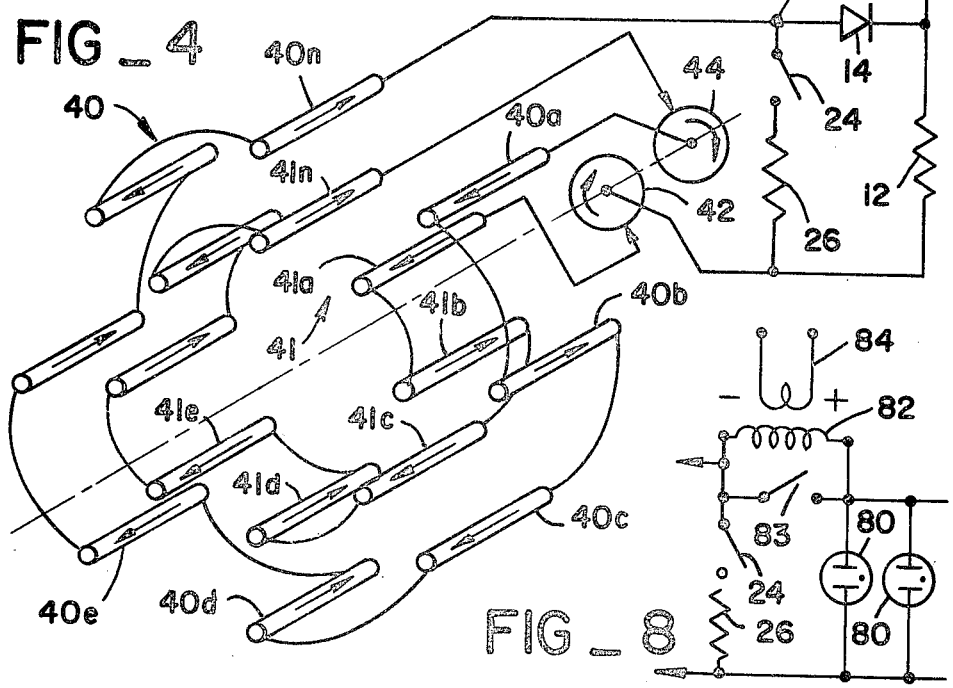

METHOD OF AND MEANS FOR HIGH PERFORMANCE DIRECT CURRENT ELECTRICAL PULSE GENERATION UTILIZING MECHANICAL ENERGY STORAGE

TECHNICAL FIELD

This invention relates to the generation of high energy direct current electrical pulses and more particularly to the improved high performance conversion of inertially stored mechanical energy into a high energy direct electrical current pulse of short time duration.

BACKGROUND ART

There are many applications for high energy direct current electrical pulses of short time duration. For example, a xenon flashlamp of the type used to pump a solid state laser may require a pulse of direct current electrical energy having a pulse width of about 500 microseconds with a total energy in excess of 20,000 joules. The ideal pulse would be an exponentially rising pulse followed by a fast decay with a peak power approaching 100 megawatts at starting voltages in excess of 30,000 volts and peak currents approaching 5,000 amperes. There are applications in which a number of xenon flashlamps are operated simultaneously in parallel with each other thus creating a demand for a source capable of providing more than a million joules of energy in a 500 microsecond pulse at the voltage required and with sufficient total peak current to operate all of the flashlamps.

The most widely used method and means for generating a high energy electrical pulse of direct current includes the steps of accumulating and storing electrical energy in a capacitor bank over a period of time and then discharging all of the accumulated energy in a single pulse of short time duration. Very high voltage pulses at very high currents may be obtained in this way. However, the size and cost of the capacitor banks, used to accumulate the energy, increase in direct proportion to an increase in the energy of the desired pulse. For example, a capacitor bank capable of storing more than a million joules of electrical energy to be discharged in a single high voltage, high current pulse would require more than 4,000 cubic feet of space per million joules stored at a cost of more than $200,000 per million joules stored.

Direct current electrical energy may also be stored chemically as in a bank of batteries. However, batteries tend to be more massive than capacitors and would be at least as expensive and require at least as much space. Furthermore, the inherent internal resistance of battery cells impose limitations on their discharge capabilities, making it impractical to obtain an electrical pulse of short time duration therefrom at the high voltage and high current required to provide a million joules and more of electrical energy.

In the prior art, attempts have been made to generate high energy direct current electrical pulses of short time duration by instantaneous relative movement of a magnetic field with respect to the conductor. For example, high direct electrical currents have been established in the primary winding of a transformer and then interrupted to collapse the magnetic field and induce a high energy pulse in the secondary winding of the transformer. However, this requires the opening of a switch under high current conditions resulting in arc over at the switch, preventing the generation of a substantially exponentially rising pulse in the secondary winding. Thus, the pulse width and pulse shape obtainable with such inductive devices have not been suitable for use in pulsed power applications without the use of expendable switching devices which are complicated and expensive and render this application impractical.

Attempts have also been made to generate suitable high energy pulses using a homopolar generator consisting of a conductive disc mounted for rotation about its center on a conductive shaft in a pulsed magnetic field having field lines extending at right angles to the major surfaces of the disc. Electrical energy is extracted between the periphery of the disc and the shaft by means of brushes. Slow pulses of direct currents in excess of several hundred thousand amperes can be obtained. However, the voltage which it is practical to generate in a homopolar device is very low, being of the order of 100 volts, and it is not possible to obtain pulses shorter than 200 milliseconds due to the inductance of the field coils. Thus, some sort of energy storing system such as a capacitor bank must be used with a homopolar device to raise the voltage high enough for use in pulsing flashlamps and to enable the generation of a fast rising pulse.

SUMMARY OF THE INVENTION

The present invention is directed to overcoming one or more of the problems as set forth above.

According to the present invention, a mass is rotated about a given axis and at least an increment of the inertial mechanical energy of the rotating mass is converted into a pulse of electrical energy in a given load. This is accomplished by providing an electrical conductor means adapted to produce a localized magnetic field at the surface of the rotating mass and providing a localized magnetic flux compression means at the surface of the mass for periodically compressing the flux of the localized magnetic field in response to the rotation of the mass. The given load is connected across the electrical conductor means during the compression of the flux of the localized magnetic field.

BRIEF DESCRIPTION OF THE DRAWING

This invention will be more fully understood from a reading of the following detailed description in conjunction with the drawing wherein:

FIG. 1 is a schematic representation of a simplified device illustrating a basic principle of this invention.

FIGS. 2a-2c are in part a schematic and in part a simplified fragmentary cross-sectional view of the electromagnetically active portion of a device according to this invention in sequential positions in operation with current flow and magnetic flux indicated thereon.

FIGS. 3a-3c are schematic cross-sectional representations of the conductors of a preferred embodiment of this invention in a series of sequential relative positions in operation with current flow and magnetic flux indicated thereon.

FIG. 4 is a simplified perpective view of the preferred embodiment of FIG. 3, showing the electronic circuitry associated therewith schematically.

FIG. 5 is an enlarged fragmentary cross-sectional view showing preferred structural details of the electrical conductors of the embodiment of FIGS. 3 and 4.

FIG. 6 is a further enlargement of a fragment of FIG. 5.

FIG. 7 is a pulse diagram showing the idealized electrical current output of the embodiments of this invention shown in the drawing.

FIG. 8 is a schematic diagram of an alternate embodiment of the electrical circuitry according to this invention which may be used for driving flashlamps, for example.

FIG. 9 is an end view in elevation of a structure according to the embodiment of this invention shown in FIGS. 3 and 4, taken along line 9-9 of FIG. 10.

DETAILED DESCRIPTION OF THE INVENTION

Figure 10:
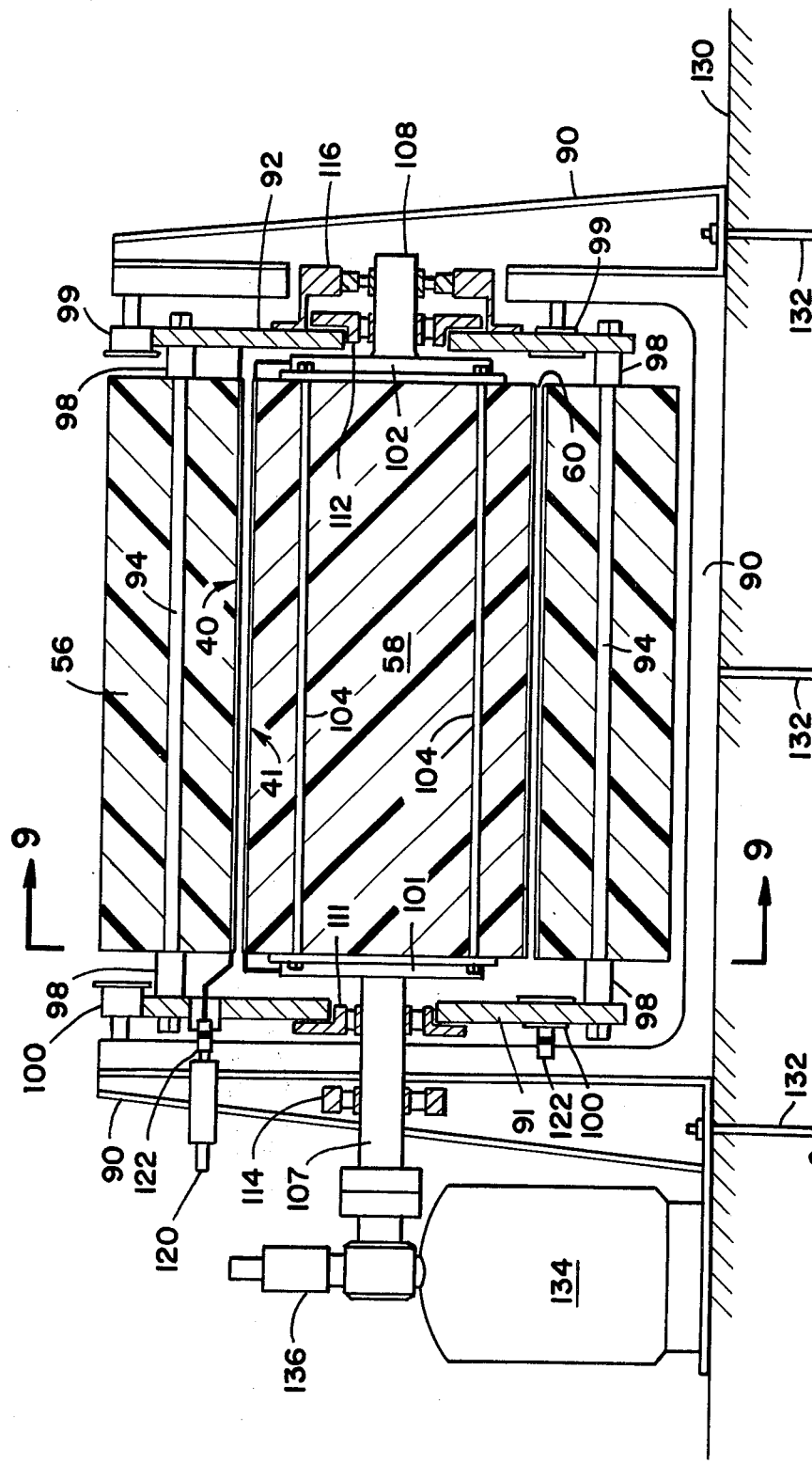
FIG. 10 is a side view of the structure shown in FIG. 9 partially in cross-section.

Referring to FIG. 1, a schematic representation of a basic principle of this invention is shown. According to this representation, an inductive coil 10 is electrically connected in parallel with the load 12 through a diode 14. A source of starting voltage and current represented by battery 16 is selectively connected across the diode 14 by means of a switch 18. Closure of the switch 18 will cause current to flow through the load 12 and inductive coil 10, establishing a magnetic field in the inductive coil 10.

A movable core 20 of magnetic material is normally received within the coil 10 as indicated by the phantom lines. Upon closure of the switch 18, the core 20 is withdrawn from the coil 10, as indicated by the arrow 22. When the core 20 is received within the coil 10, as indicated by the phantom lines, it is permeated by the magnetic flux resulting from the passage of current through the coil 10. Mechanical energy will be required to move the core 20 in the direction indicated by the arrow 22 to the position shown in solid lines against the force exerted on the core 20 by the magnetic field of the coil 10 due to the rate of change of the flux lines in the core 20 as it moves. As a result, mechanical energy exerted on the core 20 will be converted into electrical energy in the coil 10, reinforcing the energy of the battery 16.

Thus, a pulse of electrical current will be produced in the coil 10 as the core moves from the position shown in dotted lines to the position shown in solid lines in FIG. 1. Such current will flow through the diode 14 and load 12. The battery 16 would provide an alternate current path but for its high internal resistance. Such alternate current path may be eliminated by opening the switch 18, preferably at the beginning of the pulse to avoid the possibility of arc over at the switch 18 due to the high current developed during the pulse.

If sufficient mechanical energy is exerted on the core 20 to cause it to move at very high velocity in the direction indicated by the arrow 22, a pulse of direct current rising rapidly to a substantial value will be produced through the coil 10 and load 12. The rapid rise in the current results from the fact that the withdrawal of the core 20 from the coil 10 will not only compress the flux of the magnetic field of the coil 10 but will also reduce the inductance of the coil 10.

If all of the mechanical energy acting on the core 20 is converted into electrical energy at the peak of such current pulse, the core 20 will tend to be drawn back into the coil 10, resulting in a decrease in the current pulse as the core 20 reenters the coil 10. The inertia of the core 20 would tend to produce a negative pulse as the core 20 moves in the direction opposite that indicated by the arrow 22 within the coil 10. However, the diode 14 will prevent any negative current flow through the load and coil and the open switch 18 will prevent any current flow through the battery 16. Thus, although the residual magnetism of the core 20 and its inertial motion in a direction opposite to the arrow 22 may generate a voltage across the diode 14, no energy exchange can take place.

The device shown schematically in FIG. 1 would be complicated and inconvenient to construct with sufficient power output to be of interest. However, if mechanically configured as shown in FIGS. 2a-2c, a substantial power output can conveniently be obtained.

In FIGS. 2a-2c, the electronic circuitry would be functionally the same as that shown in FIG. 1, and thus the same reference numerals have been used for equivalent elements. However, in FIGS. 2a-2c, the inductive coil 10 comprises a plurality of elongated parallel strands extending perpendicularly to the plane of the paper as indicated in cross-section by the circles 10a-10d of FIG. 2a. As described herein, electrical current flow is considered as moving from positive to negative and strands 10a-10d of the coil are electrically connected in sinuous fashion so that electrical current flow into the plane of the paper in conductor 10d (as indicated by the cross within the circle 10d) will result in electrical current flow out of the plane of the paper in conductor 10c (as indicated by the dot) into the plane of the paper in conductor 10b, (as indicated by the cross) and out of the paper in conductor 10a (as indicated by the dot). The near end of strand 10a is connected to one side of the load 12 through the diode 14 and the far end of strand 10d is connected to the other side of the load 12. The battery 16 is connected across the diode 14 with its negative terminal connected to strand 10a and its positive terminal connected to the load 12 through the switch 18.

A first pole piece 11 made of magnetic material and having a plurality of elongated grooves therein extending perpendicularly to the plane of the paper is provided, with each of the strands 10a-10d being received within a different one of the grooves. A second pole piece 30 is provided which is identical to the first pole piece 11 and arranged in close spaced relation thereto with the grooves in opposition. According to this embodiment of the invention, a pulse of electrical energy is obtained through relative movement between the pole piece 11 and the pole piece 30, as indicated by the arrow 22. For ease of understanding, the pole piece 11 may be considered to be stationary with the pole piece 30 being moved in the direction indicated by the arrow 22.

Closure of the switch 18 will result in current flow through the strands 10a-10d, as indicated in FIG. 2a. When the grooves in the pole piece 30 are in alignment with the grooves in the pole piece 11 as shown in FIG. 2a, the electrical current flow through the conductors 10a-10d will result in the establishment of a magnetic field between such pole pieces as indicated by the arrows 32.

Upon movement of the pole piece 30 with respect to the pole piece 11 toward the position shown in FIG. 2b wherein each groove of the pole piece 30 is located intermediate the pair of grooves of the pole piece 11, the magnetic flux of the field will tend to be compressed within the pole piece 30 as indicated by the arrows 32 in FIG. 2b. In effect, some magnetic material of at least the pole 30 has been removed from the magnetic field in a manner corresponding to removal of the core 20 from the coil 10 in the device of FIG. 1.

Thus, as the pole piece 30 moves from its position with respect to the pole piece 11 shown in FIG. 2a to that shown in FIG. 2b, a pulse of electrical current will be passed through diode 14 and the load 12 reinforcing the current flow produced by the battery 16. The switch 18 may be opened at the beginning of such pulse, which pulse will tend to rise to a maximum value corresponding to the maximum flux compression and then decrease to zero as the flux compression decreases.

As the pole piece 30 moves with respect to the pole piece 11, from the position shown in FIG. 2b, to the position shown in FIG. 2c, the flux lines of the magnetic field will tend to return to their expanded state corresponding to that shown in FIG. 2a. However, the current flow through the strands 10a-10d will approach zero as the pole pieces 11 and 30 approach their relative positions as shown in FIG. 2c.

If the impedance of the load 12 combined with the impedance of the diode 14 were exactly matched to the effective impedance of the coil 10 comprising strands 10a-10d and the pole pieces 11 and 30, it is nearly possible to convert all of the mechanical energy of the system into electrical energy in the pulse except for inherent losses, thus almost stopping the movement of the pole piece 30 with respect to the pole piece 11. However, the relative motion of the pole piece 30 with respect to the pole piece 11 in the direction indicated by the arrow 22 will tend to continue at greatly reduced velocity. As such motion continues, a reverse voltage is produced across the diode 14. In order to avoid any possibility of reverse current flow through the load 12 and prepare the device for repeated utilization, a series array of switch 24 and dumping impedance 26 is provided in parallel with the load 12 and diode 14 according to the embodiment of this invention shown in FIGS. 2a-2c.

In FIGS. 2a-2c, the pole pieces 11 and 30 are shown as rectilinear structural members in cross-section. However, in a practical embodiment of this invention, the pole piece 11 would be an annular right circular cylinder with the grooves formed in its inner surface and the conductors 10a-10d arranged in cylindrical array in such grooves. The pole piece 30 whould be a solid right circular cylinder having the grooves formed in its exterior surface and an exterior diameter slightly smaller than the interior diameter of the pole piece 11. The pole piece 30 would be mounted coaxially within the pole piece 11 for rotation with respect to the pole piece 11 (in a clockwise direction, for example, as indicated by the arrow 22) about their common axis which would be perpendicular to the plane of the paper below the bottom thereof.

The mass of the pole piece 30 will, of course, enable the storage of inertial mechanical energy therein when it is rotated about its axis and since a large amount of stored mechanical energy is desired, the pole piece 30 should have a large mass and/or a high velocity. A cylindrical pole piece of large mass would tend to have a large diameter and thus the fragmentary cross-section of pole pieces 11 and 30 in FIGS. 2a-2c may be considered to have a slight curvature of relatively large radius which is not detectable in the small fragments illustrated.

In operation, both switches 18 and 24 would be initially open and the pole piece 30 would be driven to cause it to rotate at a given velocity. The position of pole piece 30 with respect to pole piece 11 would be sensed and just before the relative position shown in FIG. 2a is reached, the switch 18 would be closed to establish a voltage across the strands 10a-10d of the coil. Such voltage would produce a current flow through the load 12 and the strands 10a-10d and a resulting magnetic field as indicated in FIG. 2a.

As pole piece 30 continues to rotate with respect to pole piece 11 toward their relative positions shown in FIG. 2b, the current flow through the load 12 and strands 10a-10d will increase exponentially. The switch 18 will be opened as soon as such increase in current begins.

If the combined impedance of the load 12 and diode 14 is selected to match the impedance of the coil including strands 10a-10d, nearly all of the mechanical energy stored in the rotation of the pole piece 30 will be converted to electrical energy in an exponentially rising pulse of current through the load 12. The rotation of the pole piece 30 with respect to the pole piece 11 will be strongly braked and the current flow through the load will decrease very rapidly as the pole piece 30 approaches its relative position with respect to the pole piece 11 shown in FIG. 2c.

The switch 24 is closed just before the pole piece 30 reaches its relative position with respect to pole piece 11 shown in FIG. 2c connecting the impedance 26 in parallel with the impedance of the load 12 and diode 14. Since the phase of the voltage across the strands 10a-10d will lead that of the current through the strands, a negative pulse of electrical energy will be generated as the pole piece 30 continues to move with respect to the pole 11 beyond the position shown in FIG. 2c. If the impedance 26 is properly selected, a further braking of the movement of pole piece 30 with respect to pole piece 11 will result. The diode 14 will, of course, prevent such negative pulse from causing a negative current flow through the load 12.

Although it is possible that a second positive pulse could be produced by continued movement of the pole piece 30 with respect to pole piece 11 after the negative pulse, the energy of such further positive pulse would be very small and would be divided between the impedance 26 and the load 12 and thus reduced to a value low enough to be of negligible consequence.

As soon as the rotation of the pole piece 30 has stopped or reached a constant low velocity, the switch 24 may be opened and the pole piece 30 again driven to increase its velocity of rotation. The maximum velocity at which the pole piece 30 is rotated is determined by the mass of the pole piece 30 and the amount of stored mechanical energy which is required. The width of the grooves in the pole pieces 11 and 30 is determined by the pulse width desired and the maximum velocity of rotation of the pole piece 30.

The embodiment of this invention shown in FIGS. 2a-2c is subject to the disadvantage that the pole pieces 11 and 30 will introduce losses into the system. Such losses can be reduced by making the pole pieces 11 and 30 of thin shims of magnetic material insulated from each other to avoid eddy currents as is known in the motor/generator art. However, such fabrication techniques are expensive and some losses would still be present.

The preferred embodiment of this invention in which the use of pole pieces is avoided, is shown schematically in FIGS. 3a-3c and the simplified perspective of FIG. 4.

According to this embodiment of the invention, an outer cylindrical array 40 of elongated electrical conductors electrically connected in series with each other in sinuous fashion is electrically connected in series with an inner array 41 of elongated electrical conductors electrically connected in series with each other in sinuous fashion. As best shown in FIG. 4, the cylindrical arrays 40 and 41 are mounted coaxially with the elongated conductors thereof extending parallel to each other and to the common axis of the cylindrical arrays with the cylindrical array 41 aligned within the cylindrical array 40. According to this embodiment of the invention, the inner cylindrical array 41 is mounted for rotation in a clockwise direction, for example, with respect to the outer cylindrical array 40 which may be considered to be stationary.

One end of the load 12 is connected to one end of a first elongated conductor 41a of the inner cylindrical array by means of a rotary brush arrangement 42 mounted for rotation with the inner cylindrical array 41. The next adjacent elongated electrical conductor 41n of the inner cylindrical array 41 in a counterclockwise direction from the elongated conductor 41a is connected through a rotary brush arrangement 44 mounted for rotation with the inner cylindrical array 41 to a first conductor 40a of the outer cylindrical array 40. The other end of the load 12 is connected through the diode 14 to the elongated electrical conductor 40n of the outer cylindrical array 40 which is next adjacent the first elongated conductor 40a in a counterclockwise direction.

According to the embodiment of this invention shown in FIG. 4, a charged capacitor 17 is connected across the diode 14 by means of the switch 18 in order to provide a larger trigger voltage than can be conveniently obtained by means of a battery 16. The positive plate of the capacitor 17 is connected to the load 12 and thus upon closure of the switch 18, current will flow through the elongated conductors of the cylindrical arrays 40 and 41 as indicated by the arrows in FIG. 4.

As will be more fully described hereinafter, the elongated electrical conductors of the inner cylindrical array 41 are mounted at the exterior surface of a cylindrical rotor of substantial mass which is driven to rotate with respect to the elongated electrical conductors of the outer cylindrical array 40 at an angular velocity sufficient to provide the necessary or desired stored mechanical energy. The elongated electrical conductors of the outer cylindrical array 40 are mounted at the inner surface of an annular stator member to withstand the mechanical forces involved, as will be more fully described hereinafter.

The operation of the embodiment of this invention shown in FIG. 4 will be more fully understood from FIGS. 3a–3c. Assuming that the inner cylindrical array 41 has been driven to rotate at the desired angular velocity with respect to the outer cylindrical array 40, the switch 18 is closed just before the elongated conductors of the inner array 41 have reached their relative positions with respect to the elongated conductors of the outer array 40, as shown in FIG. 3a. The discharge of the capacitor 17 through the load and through the elongated conductors of the cylindrical arrays 40 and 41 will produce a current flow as indicated in FIG. 4 by the dots and crosses within the circles representing cross-sections of the elongated conductors in FIG. 3a. Thus, the current flow in the first elongated conductor 40a of the outer array and the first elongated conductor 41a of the inner array will be out of the plane of the paper of FIG. 3a while the current flow through the next elongated conductor 40b in a clockwise direction of the outer array 40 and the current flow through the next elongated conductor 41b in a clockwise direction of the inner array 41 will be into the plane of the paper of FIG. 3a, and so on. Such current flow will produce magnetic field lines 52 about the elongated conductors which will reinforce each other when such conductors are in their relative positions shown in FIG. 3a. It will be understood that the curvature of the cylindrical arrays 40 and 41 has been omitted in FIGS. 3a–3c for convenience of illustration.

As the elongated electrical conductors of the inner cylindrical array 41 approach their relative positions with respect to the elongated electrical conductors of the outer cylindrical array 40 shown in FIG. 3b, the flux of the magnetic field produced by current flow therethrough will be compressed as indicated by the arrows 52 in FIG. 3b. In other words, since the current flow through the elongated electrical conductor 40c, for example, of the outer cylindrical array is in the opposite direction from the current flow through the elongated conductor 41b of the inner array, the magnetic fields about such conductors produced by such current flow will tend to oppose each other, resulting in a compression of their respective flux. In addition, as the elongated electrical conductor 41b enters into alignment with elongated electrical conductor 40c, their respective inductances will tend to compensate for each other. The result is an exponential increase in the current flow through both, as described hereinabove.

Referring again to FIG. 4, the switch 18 is preferably opened after the arrays 40 abd 41 have passed their relative positions shown in FIG. 3a and are moving toward their relative positions shown in FIG. 3b. An exponentially rising pulse of electrical current will pass through the diode 14 and load 12, tending to stop the rotation of the inner cylindrical array 41 with respect to the outer cylindrical array 40. Assuming that the impedance of the load 12 and diode 14 is properly matched to the impedance of the cylindrical arrays 40 and 41, the angular velocity of the inner cylindrical array 41 will be at least greatly reduced.

As the inner cylindrical array 41 continues to move with respect to the outer cylindrical array 40 toward the relative positions thereof shown in FIG. 3c, the current flow through the elongated conductors of such arrays will decrease very rapidly, tending to reach zero at their relative positions shown in FIG. 3c. Since the voltage of the system will lead the current in the system, there will be a negative voltage across the conductors of the arrays 40 and 41 when they are in their relative positions shown in FIG. 3c, resulting in the possibility of a negative pulse of current to the load 12, However, immediately before the arrays 40 and 41 reach the relative positions shown in FIG. 3c, the switch 24 is closed to place the impedance 26 in parallel with the load 12 and diode 14. This will result in the dissipation of additional mechanical energy stored in the continued rotation of the inner cylindrical array 41 in a negative pulse in the impedance 26. If the impedance 26 is properly selected, much of the residual mechanical energy will be dissipated in the negative pulse and any further positive pulse through the diode 14 and load 12 will be of greatly reduced magnitude.

According to this invention, the spacing between the centers of all adjacent elongated conductors such as the strands 10a-10d of FIG. 2, and the elongated conductors of the cylindrical arrays 40 and 41, must be equal to each other. In the embodiment shown in FIGS. 3 and 4, the angular spacing between the centers of adjacent elongated conductors of the cylindrical array 41 must be equal to the angular spacing between the centers of adjacent elongated conductors of cylindrical array 40. According to the embodiment of this invention shown in FIGS. 2a-2c where the pole pieces 11 and 30 are coaxial cylindrical members as described, the angular spacing between the centers of adjacent strands of the coil 10 must approximate the angular distance traveled by the pole piece 30 at its maximum velocity in the time required for the pulse. In the embodiment of this invention shown in FIGS. 3a-3c, the angular spacing between adjacent conductors of the cylindrical arrays 40 and 41 is set by one-half the time required for the desired pulse of electrical energy at maximum velocity.

It is pointed out that in FIGS. 3a-3c, and 4, the structural details of the preferred embodiment of this invention are simplified for ease of understanding. In particular, the elongated conductors of the cylindrical arrays 40 and 41 are shown as simple wires of circular cross-section. Thus, the radius of the circular cross-section of the conductors limits the minimum spacing possible between the center of a conductor of the outer array 40 and the center of a conductor of the inner array 41 when they are in alignment with each other.

In order to approach maximum flux compression, it is necessary for the spacing or air gap between the pole pieces 11 and 30 in the embodiment of FIG. 2 to be as small as possible. Similarly, in the embodiment of FIGS. 3a-3c and 4, in order to approach maximum flux compression, it is necessary for the spacing between the cross-sectional centers of the elongated conductors of the cylindrical arrays 40 and 41 to be as small as possible in a radial direction when in alignment.

Thus, in actually fabricating the preferred embodiment of this invention as shown in FIGS. 3a-3c and 4, the elongated conductors of the arrays 40 and 41 are preferably strip-like having a substantial width transverse to their axis of elongation with respect to their thickness. Referring to FIGS. 5 and 6, structural details of appropriate strip-like elongated conductors according to the preferred embodiment of this invention are shown.

According to the structure shown in FIGS. 5 and 6, an annular member 56 of high strength non-magnetic and non-conductive material supports the outer cylindrical array 40 of conductors on its inner cylindrical surface. A rotor member 58 comprising a right circular cylinder also made of non-magnetic non-conductive material, supports the inner cylindrical array 41 of elongated conductors on its outer surface. The external diameter of the rotor member 58 closely approaches the internal diameter of the annular member 56 and is coaxially mounted therewithin in order to provide a small annular air gap 60 therebetween. The annular member 56 and rotor member 58 may be made, for example, of nylon with approximately 35% short glass fiber fill.

As shown in FIGS. 5 and 6, each of the elongated conductors 40a-40n of the outer cylindrical array 40 mounted on the inner surface of the annular member 56, may be made of a plurality of fine wire strands 62 arranged in substantially planar array. The wire strands 62 of each elongated conductor 40a-40n are insulated from each other along their length but electrically interconnected at their ends. Similarly, each of the elongated conductors 41a-41n of the inner cylindrical array 41 mounted on the exterior surface of the rotor member 58 may be made of a plurality of fine wire strands 62 mounted in substantially planar array and insulated from each other along their length but electrically connected at their ends. The insulation of the strands 62 of the elongated conductors 40a-40n and 41a-41n will prevent electric current flow transverse to the axis of elongation of such conductors and thereby avoid possible losses or spurious effects.

Referring to FIG. 6, the strands 62 of the elongated conductors 40a-40n must be rigidly fixed to the annular member 56 and the strands 62 of the elongated conductors 41a-41n must be rigidly fixed to the rotor member 58. For example, the strands 62 of the elongated conductors 41a-41n may be received in grooves formed in the exterior surface of the rotor member 58 and held in place by a thin wrapping 64 of high tensile strength about the exterior surface of the rotor member 58. Similarly, the strands 62 may be received in grooves formed in the interior surface of the annular member 56 and anchored in such grooves by appropriate high tensile strength members 66, together with appropriate bonding material 68.

As shown in FIGS. 5 and 6, the elongated conductors of the cylindrical arrays 40 and 41 made of strands 62 all have a common width and are spaced from each other in their respective arrays by a distance equal to such common width. The width of the conductors of the cylindrical arrays 40 and 41 and their spacing from each other in their respective arrays may be adjusted to produce the desired pulse shape. As pointed out hereinabove, the pulse width is determined by the maximum velocity of the rotor member 58 with respect to the annular member 56 and the number of conductors and their center-to-center spacing in the arrays 40 and 41. It should be noted that a number of adjacent elongated conductors in each array 40 and 41 could be electrically interconnected at their ends to provide effective elongated conductors of greater annular extent or width if desired to provide a particular pulse width at a particular angular velocity of the rotor member. The current and voltage produced by the device would be a function of the total length of the elongated conductors of the arrays 40 and 41. It is noted that such elongated conductors could be wound in a wide variety of configurations well-known to the motor/generator art to provide a plurality of poles about the periphery of the rotor member 58 in accordance with the teaching of this invention.

Referring to FIG. 7, a diagram showing the preferred current pulse to be produced by a device according to this invention where zenon flashlamps are the load, is shown. Current through the load is plotted on the ordinant of the diagram and time is plotted on the abscissa of the diagram. As shown, the application of the trigger voltage by closure of the trigger switch 18 will produce a current flow through the load and conductors at time A (FIG. 7) corresponding to the relative position of the elements of the device as shown in FIGS. 2a and 3a. Such current will increase exponentially, reaching a peak at about time B (FIG. 7) when the elements of the device reach the relative positions shown in FIGS. 2b and 3b. The current to the load will then decrease very rapidly and the switch 24 will be closed at a time indicated by the dashed line shortly before time C (FIG. 7) when the elements of the device reach their relative positions as shown in FIGS. 2c and 3c, thus reducing the current through the load even more rapidly as it approaches zero.

In a typical application where flashlamps are the load, the pulse width from time zero to closure of the switch 24 would be about 500 microseconds. The peak current should be about 3000 amperes for each flashlamp at a voltage of approximately 20,000 volts and the total energy in the pulse should be about 10,000 joules.

Referring to FIG. 8, an alternate embodiment of the circuit of this invention suitable for use where flashlamps are the load is shown. Two or more flashlamps 80 may be connected in parallel across the output of a device according to this invention through the secondary winding 82 of a pulse transformer. A bypass switch 83 is connected across the secondary winding 82 and a dumping switch 24 and impedance 26 is connected across the output of the device as described hereinabove. Thus, the application of an appropriately timed trigger pulse through the primary winding 84 of the pulse transformer will produce a high voltage pulse in the secondary winding 82 which will trigger the flashlamps 80 and initiate current flow through the device. As soon as such current flow begins to increase exponentially through the action of the device, the bypass switch 83 is closed to eliminate the inductance of the primary winding 82. The switch 24 is closed at the end of the pulse as discussed hereinabove, to dissipate the negative pulse and any residual energy in the impedance 26. It is noted that the flashlamps 80 will be extinguished at the end of the pulse and will tend to remain nonconductive since the voltage of the subsequent negative pulse will not be sufficient to trigger them into a reverse conducting state.

Figure 11:
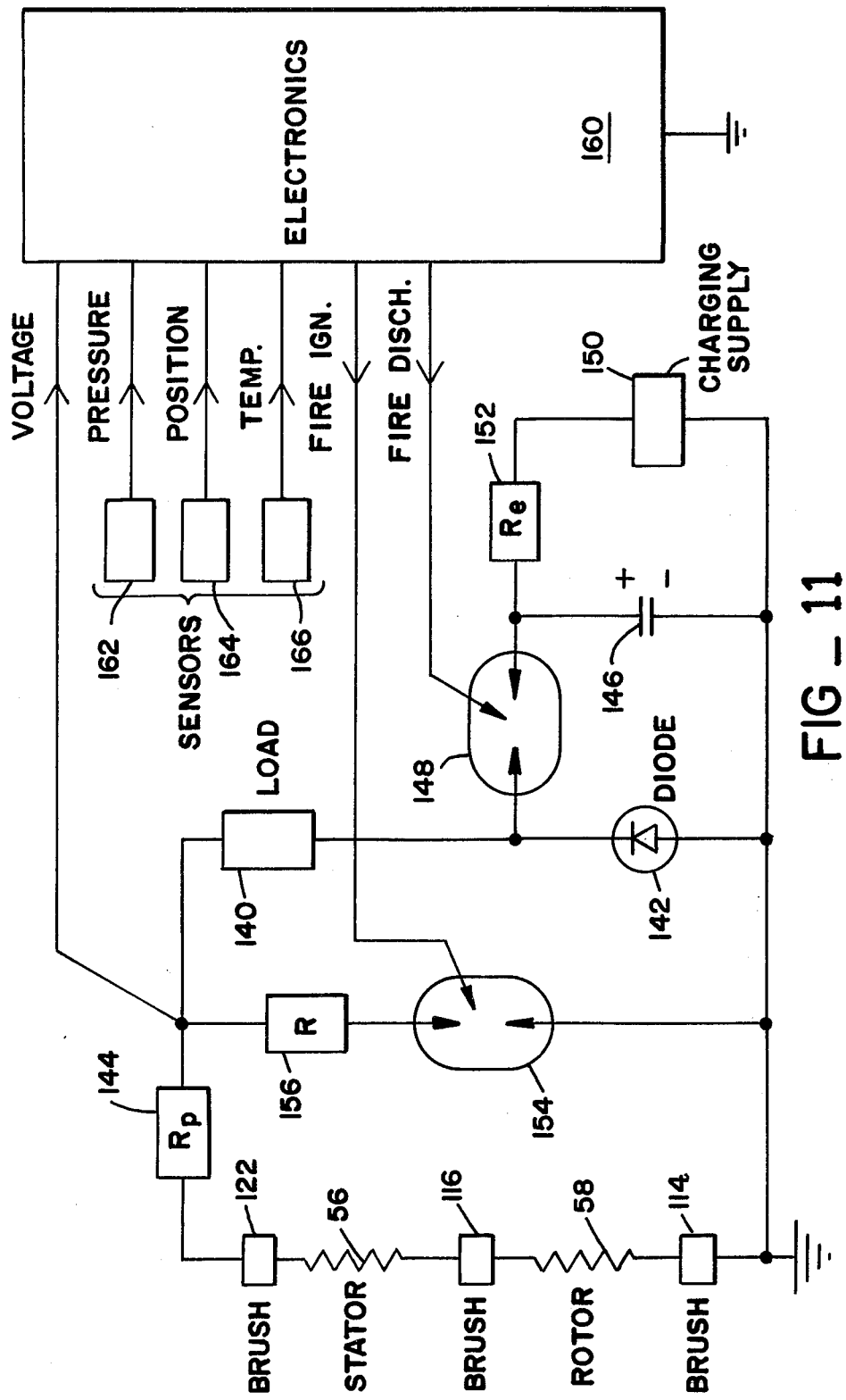
FIG. 11 is a diagram showing the preferred embodiment of this invention according to FIGS. 3 through 10 partially in block form and partially in schematic form.

Referring to FIGS. 9, 10 and 11, the best mode contemplated for the practice of this invention is shown. As best shown in FIG. 9, an annular stator member 56 is constructed as described in connection with FIGS. 5 and 6 is mounted by means of frame members 90 at its opposite ends with its axis extending horizontally. A cylindrical rotor member 58 constructed and described in connection with FIGS. 5 and 6 is also mounted on frame members 90 coaxially within annular member 56 for rotation about its axis with respect to annular member 56.

As best shown in FIG. 10, a pair of annular plates 91 and 92 are each fixed to a different end of the annular member 56 by means of a plurality of elongated bolts 94 which pass through the annular member 56 centrally of the wall thereof and parallel to its axis. The bolts 94 are arranged in circular array as indicated by the line 96 in FIG. 9 and are spaced from the ends of the annular member 56 by means of spacers 98. The outer periphery of the annular plate 92 rides on three insulated rollers 99 at points spaced 120° from each other as best shown in FIG. 9. The rollers 99 are mounted for rotation about their respective axes on the support frame 90. Similarly, the outer periphery of the annular plate 91 rides on three rollers 100 spaced 120° apart about the periphery of the plate 91 and mounted for rotation about their respective axes on the other support frame member 90. Thus, the annular stator member 56 can rotate about its axis with respect to the frame members 90 for reasons which will be discussed more fully hereinafter.

The rotor member 58 has a pair of plate members 101 and 102 rigidly fixed to its opposite ends by means of a plurality of elongted bolts 104 passing therethrough in spaced relation to the outer periphery thereof. As best shown in FIG. 9, the bolts 104 are arranged in circular array as indicated by the line 106 and extend parallel to the axis of the rotor member 58. The plates 101 and 102 are each provided with a short shaft which projects axially from the rotor member 58. The shaft 107 is journaled in a roller bearing carried in the central opening of the annular plate 91 and the shaft 108 is journaled in a roller bearing 112 carried in the central opening of the annular plate 92. Thus the rotor member 58 is adapted to rotate about its axis with respect to the stator member 56.

The bolts 104 are electrically insulated from the plates 101 and 102 and the shafts 107 and 108 thereon. A rotary brush arrangement 114 provides means for electrically connecting the shaft 107 to ground. One of the elongated conductors of the array 41 on the outer periphery of the rotary member 58 is electrically connected to the plate 101 and thus through the shaft 107 and rotary brush 114 to ground. As described hereinabove, the elongated conductors 41a–41n on the outer periphery of the rotor member 58 are connected in series in sinuous fashion and the elongated conductor 41n is electrically connected to the plate 102 and thus to the shaft 108. A rotary brush 116 is provided for electrically connecting the shaft 108 to the annular plate 92.

The bolts 94 are electrically insulated from the plates 91 and 92 and one of the elongated electrical conductors of the array 40 at the inner periphery of the annular stator member 56 is electrically connected to the plate 92. As described hereinabove, the elongated conductors 40a–40n at the inner periphery of the annular stator member 56 are connected in series in sinuous fashion and the elongated conductor 40n is electrically connected to a brush arrangement 122 insulatingly mounted on the plate member 91. A high voltage output terminal 120, insulatingly mounted on the frame member 90 is electrically connected to brush arrangement 122. Thus, an electrical path is provided from ground through the brush arrangement 114 to the series arrangement of elongated conductors on the rotor 58 and from thence through the brush arrangement 116 to the series connected conductors of the stator 56 with the output of the device being taken through the brush arrangement 122 and high voltage terminal 120.

In operation, the rotor member 58 would be driven to cause it to rotate at high velocity with respect to the stator member 56 by means of a motor 124 (FIG. 9) for example, which may be connected to the shaft 107 by means of a belt 126 to provide a clutch action. As explained hereinabove, when the device is actuated to produce a pulse of energy, the flux compression between the rotor 58 and stator 56 will result in a large mechanical reaction force as the rotor is braked. Some of such reaction force will be taken up by the rotation of the stator 56 on the rollers 99 and 100 which may be friction loaded to prevent rotation of stator 56 under low force conditions. Thus, the strain on the frame members 90 which are rigidly fixed to the supporting surface 130 by means of bolts 132, for example, will be reduced. However, stress calculations indicate that it would not be possible for the bearings 111 and 112 to withstand the radial forces produced by even a partial asymmetry of the magnetic field at the moment of highest field strength. Thus, even though the device is designed to provide symmetry of the magnetic field in operation, the use of a hydrostatic bearing is contemplated. For this reason, the bearings 111 and 112 are shock mounted. A compressed air tank 134 is provided which is charged by a small compressor (not shown).

The shaft 107 is hollow and communicates with a plurality of bores (not shown) in the rotor 58 for conducting air to the annular space 60 between the rotor 58 and the stator 56. A fast acting pneumatic valve 136 connects the compressed air tank 134 to the hollow shaft 107 prior to actuation of the device to provide positive air pressure in the space between the rotor 58 and stator 56 during operation of the device. Such positive air pressure provides a hydrostatic bearing which will insure that the rotor 58 will remain centered within the stator 56.

Referring to FIG. 11, an electronic control system suitable for use according to this invention is shown partially in block form and partially in schematic form. Thus the stator 56 and rotor 58 together with the rotary brush arrangements 114, 116 and 122 of the device of FIGS. 9 and 10 are indicated schematically at the left-hand side of FIG. 11. The load 140 which may be a parallel arrangement of a plurality of flashlamps is connected through a diode 142 to the grounded brush 114 and through a current limiting resistor 144 to the output brush 122. The current limiting resistor 144 is provided to prevent the imposition of excessive mechanical force on the stator 56 by the rotor 58 in the event of a direct short circuit thereacross during the pulse. A source of trigger voltage which may be an appropriate capacitor bank 146 is connected across the diode 142 through a spark gap or ignitron 148. The trigger voltage may be accumulated from a relatively small power supply 150 connected across the capacitor bank 146, for example, through an appropriate charging resistor 152.

A spark gap or ignitron 154 is connected in parallel with the load 140 and diode 142 through a dumping impedance 156. The spark gap 154 and spark gap 148 function as normally open switches which are closed under the control of conventional electronic circuitry indicated by the block 160 at the right-hand side of FIG. 11 to actuate the device.

In operation, the rotor member 58 is driven to cause it to rotate at the desired velocity. When such desired velocity of rotation is reached, the air valve 136 is opened to establish a hydrostatic bearing between the rotor 58 and the stator 56 as described hereinabove. The electronic circuitry 160 includes a sensor 162 which confirms that the desired hydrostatic bearing pressure has been established and conditions the electronic circuitry for the generation of a pulse.

Electronic circuitry 160 also includes a sensor 164 adapted to detect the proper relative position of the rotor 58 with respect to the stator 56 for the initiation of the pulse and activate the electronic circuitry 160. Finally, the electronic circuitry includes a temperature sensor 166 adapted to prevent the initiation of a pulse if the temperature of the rotor and stator exceeds a predetermined level and thus delay the initiation of a pulse until the rotor and stator have cooled to a safe operating temperature.

Electronic circuitry 160 is electrically connected to trigger the spark gap 148 when proper pressure, position and temperature are detected by the sensors 162, 164 and 166, respectively. The triggering of the spark gap 148 will discharge the capacitor bank 146 through the load 140, stator 56 and rotor 58. Where the load 140 comprises a parallel array of flashlamps, for example, the discharge of the capacitor bank 146 will trigger such flashlamps rendering them highly conductive. The high current pulse due to flux compression between the rotor 58 and stator 56 will pass through the diode 142 and the flashlamps of the load 140, resulting in the desired intense pulse of light.

Electronic circuitry 160 includes an electrical connection for detecting the voltage across the rotor and stator to ground. Electronic circuitry 160 is also electrically connected to trigger the discharge of the spark gap 154. Thus, when the voltage across the rotor 58 and stator 56 reverses at the end of the desired pulse, the electronic circuitry 160 will fire the spark gap 154, causing any negative pulse to be dissipated in the impedance 156 in accordance with the teaching of this invention.

In the embodiment of this invention shown in FIGS. 9 through 11, the rotor 58 has a length of 2 meters, a diameter of 1 meter and a mass of about 2200 kilograms. When rotated at 2400 revolutions per minute, the mechanical energy stored in the rotor is in excess of 8 megajoules. Thus, the conversion of 1 megajoule of such stored mechanical energy into a 1 megajoule 500 microsecond pulse of electrical energy can be accomplished without the generation of destructive mechanical forces. The device will not occupy more than about 650 cubic feet of space and it has been calculated that the device can be produced in quantity at a unit cost of $40,000.00, or less.

It is expected that those skilled in the art will be able to make obvious modifications in the specific embodiments of this invention without departing from the teaching of the foregoing specification or the scope of the following claims. As pointed out herein, various types of mechanical and electronic switching devices can be used since they are actuated under low current conditions according to the teaching of this invention. As used in the foregoing specification and the following claims, the term "flux compression" means the concentration of the flux of a given magnetic field in space and time and a flux compression means may comprise any means which concentrates the flux of a magnetic field in time and space. Specifically, flux compression is not to be interpreted as merely the inductive effect according to Lenz's Law but as the additional effect resulting from the concentration of flux as discussed hereinabove.

What is claimed is:

1. The method of converting inertial mechanical energy into a pulse of electrical energy in a given load comprising the steps of:
   (a) rotating a mass about a given axis to provide a source of inertial mechanical energy;
   (b) providing an electrical conductor means adapted to produce a localized magnetic field at the surface of said rotary mass by electrical current flow therethrough;
   (c) providing a localized magnetic flux compression means at the surface of said rotating mass;
   (d) rotating one of said electrical conductor means and said magnetic flux compression means with said rotating mass to periodically compress the flux of said localized magnetic field in response to said rotation of said mass; and
   (e) connecting said given load across said electrical conductor means during said compression of said flux of said localized magnetic field.

2. The method of claim 1 including the steps of:
   (f) initially rotating said mass without electrical current flow through said electrical conductor means;
   (g) sensing the position of said electrical conductor means and said localized magnetic flux compression means relative to each other; and (h) establishing an electrical current flow in a given direction through said electrical conductor means and said given load when said localized magnetic flux compression means is in position relative to said electrical conductor means to begin compressing the magnetic flux produced by electrical current flow therethrough.

3. The method of claim 2 including the step of preventing electrical current flow in the direction opposite said given direction through said given load.

4. The method of claim 2 or claim 3 including the step of electrically connecting an impedance in parallel with said load when said localized magnetic flux compression means is in position relative to said electrical conductor means to cease compressing the magnetic flux produced by electrical current flow therethrough.

5. The method of converting the major portion of the inertial mechanical energy stored in a mass rotating about a given axis and having a surface defining a right circular cylinder into a single pulse of electrical energy in a given load comprising the steps of:

(a) providing an electrical conductor means adapted to produce a plurality of localized magnetic fields in right circular cylindrical array about said surface of said rotating mass and having centers spaced a given distance from each other in said array upon flow of electrical current therethrough;

(b) providing a right circular cylindrical array of a plurality of localized magnetic flux compression means about said surface of said rotating mass having centers spaced said given distance from each other in said array;

(c) mounting one of said electrical conductor means and said array of a plurality of localized magnetic flux compression means on said mass for rotation therewith and mounting the other against rotation with said mass;

(d) electrically connecting said given load across said electrical conductor means;

(e) initially rotating said mass without electrical current flow through said electrical conductor means;

(f) sensing the position of said array of localized flux compression means relative to said plurality of localized magnetic fields; and (g) establishing an electrical current flow in a given direction through said electrical conductor means and said given load when each of said localized magnetic flux compression means is in position to begin compressing the flux of a different one of said plurality of magnetic fields produced by said electrical current flow through said electrical conductor means.

6. The method of claim 5 including the step of preventing electrical current flow in the direction opposite said given direction through said load.

7. The method of claim 5 or claim 6 including the step of electrically connecting an impedance in parallel with said load when said array of localized magnetic flux compression means is in position relative to said plurality of magnetic fields to cease compressing the magnetic flux thereof.

8. The method of converting inertial mechanical energy into a direct current pulse of electrical energy in a given load comprising the steps of:

(a) rotating a mass about a given axis to provide a source of inertial mechanical energy;

(b) providing an elongated electrical conductor means at a surface of said rotating mass adapted to produce a localized magnetic field upon passage of electrical current from one end thereof to the other end thereof;

(c) providing a localized magnetic flux compression means at said surface of said rotating mass;

(d) rotating one of said elongated electrical conductor means and said localized magnetic flux compression means with said surface of said mass to periodically compress the flux of a magnetic field produced by electrical current flow through said electrical conductor means;

(e) establishing an electrical voltage difference between opposite ends of said electrical conductor means; and (f) establishing an electrical current flow through said load and said electrical conductor means by matching the impedance of said load to said electrical conductor means when said flux compression means is in position relative to said electrical conductor means to begin compressing the flux of the magnetic field produced by said electrical current flow (g) electrically connecting an impedance in parallel with said load when said flux compression means is in position relative to said electrical conductor means to cease further compression of the flux of the magnetic field produced by said electrical current flow.

9. The method of converting inertial mechanical energy into a pulse of direct current electrical energy in a given load comprising the steps of:

(a) rotating a mass about a given axis to provide a source of inertial mechanical energy;

(b) providing an elongated electrical conductor means at the surface of said rotating mass adapted to produce a localized magnetic field at said surface of said rotating mass upon passage of electrical current through said electrical conductor means from one end thereof to the other;

(c) providing a localized magnetic flux compression means at said surface of said rotating mass;

(d) rotating one of said elongated electrical conductor means and said localized magnetic flux compression means with said surface of said rotating mass to periodically compress the flux of a magnetic field by electric current flow through said electrical conductor means;

(e) establishing a given electrical voltage difference between opposite ends of said electrical conductor means;

(f) allowing electrical current flow through said given load and said electrical conductor means when said flux compression means is in position relative to said electrical conductor means to compress the magnetic field produced by said electrical current flow at said given electrical voltage; and (g) preventing electrical current flow through said load when said flux compression means is in position relative to said electrical conductor means to compress the magnetic field produced by electrical current flow at a voltage of polarity opposite said given electrical voltage.

10. The method of converting inertial mechanical energy into a pulse of direct current electrical energy in a given load comprising the steps of:

(a) rotating a mass having a right circular cylindrical surface about a given axis;

(b) providing a first elongated electrical conductor means rigidly fixed to said surface of said mass and electrically insulated therefrom to produce a first plurality of localized magnetic fields spaced a given angular distance from each other in right circular cylindrical array about said surface of said mass upon flow of electrical current therethrough;

(c) providing a second elongated electrical conductor mounted in close spaced relation to said surface of said rotating mass against rotation therewith and insulated therefrom to produce a second plurality of localized magnetic fields upon electrical current flow therethrough spaced said given angular distance from each other in right circular cylindrical array about said surface of said mass;

(d) electrically connecting one end of said first elongated electrical conductor to one end of said second elongated electrical conductor;

(e) electrically connecting said given load across the other ends of said first and second electrical conductors;

(f) sensing the relative position of said first plurality of localized magnetic fields with respect to said second plurality of localized magnetic fields;

(g) establishing an electrical current flow in a given direction through said first and said second elongated electrical conductors and said load when said first and second electrical conductors are in position so that the localized magnetic fields produced by said electrical current flow therethrough will be mutually compressed; and (h) electrically connecting an impedance in parallel with said load when said first and second electrical conductors are in position so that the localized magnetic fields produced by said electrical current flow therethrough will cease to be further mutually compressed.

11. Apparatus for converting inertial mechanical energy into a pulse of direct current electrical energy in a given load comprising:

(a) a mass mounted for rotation about a given axis to provide a source of inertial mechanical energy;

(b) an electrical conductor means mounted to produce a localized magnetic field at the surface of said mass upon electrical current flow therethrough;

(c) a localized magnetic flux compression means mounted at the surface of said rotating mass; one of said electrical conductor means and said magnetic flux compression means being mounted for rotation with said mass and said given load being connected across said electrical conductor means.

12. Apparatus as claimed in claim 11 including means for rotating said mass and means for establishing an electrical current flow in a given direction through said electrical conductor means and said given load when said localized magnetic flux compression means is in position relative to said electrical conductor means to begin compressing the magnetic flux produced by said electrical current flow therethrough.

13. Apparatus as claimed in claim 12 including means for preventing electrical current flow in the direction opposite said given direction through said given load.

14. Apparatus as claimed in claims 12 or 13 including means for electrically connecting an impedance in parallel with said load when said localized magnetic flux compression means is in position relative to said electrical conductor means to cease compressing the magnetic flux produced by said electrical current flow therethrough.

15. Apparatus for converting the major portion of the inertial mechanical energy stored in a mass rotating about a given axis and having a surface defining a right circular cylinder into a single pulse of electrical energy in a given load comprising:

(a) an electrical conductor means adapted to produce a plurality of localized magnetic fields in right circular array about said surface of said rotating mass and having centers spaced a given distance from each other in said array upon flow of electrical current therethrough;

(b) a right circular cylindrical array of a plurality of localized magnetic flux compression means about said surface of said rotating mass having centers spaced by substantially said given distance from each other in said array; one of said electrical conductor means and said array of a plurality of localized magnetic flux compression means being mounted on said mass for rotation therewith and the other being mounted to oppose rotation with said mass;

(c) means for electrically connecting said given load across said electrical conductor means; and (d) means for establishing an electrical current flow in a given direction through said electrical conductor means and said given load when each of said localized magnetic flux compression means is in position to begin compressing the flux of a different one of said plurality of magnetic fields produced by said electrical current flow.

16. The apparatus of claim 15 wherein said means for electrically connecting said given load across said electrical conductor means includes means for preventing electrical current flow in the direction opposite said given direction through said load.

17. The apparatus of claim 15 or claim 16 including means for electrically connecting an impedance in parallel with said load when said array of localized magnetic flux compression means is in position relative to said plurality of magnetic fields to cease further compression of said magnetic flux thereof.

18. Apparatus for converting inertial mechanical energy into a pulse of direct current electrical energy in a given load comprising:

(a) a mass having a right circular cylindrical surface mounted for rotation about its cylindrical axis;

(b) a first elongated electrical conductor rigidly fixed to said surface of said mass and electrically insulated therefrom to produce a first plurality of localized magnetic fields spaced a given angular distance from each other in right circular cylindrical array about said surface of said mass upon flow of electrical current therethrough;

(c) a second elongated electrical conductor mounted in close spaced relation to said surface of said rotating mass against rotation therewith and insulated therefrom to produce a second plurality of localized magnetic fields upon electrical current flow therethrough spaced substantially said given angular distance from each other in right circular cylindrical array about said surface of said mass;

(d) means for electrically connecting one end of said first elongated electrical conductor to one end of said second elongated electrical conductor;

(e) means for electrically connecting said given load across the other ends of said first and second electrical conductors, (f) means for establishing an electrical current flow in a given direction through said load and said first and second elongated conductors when said first and second electrical conductors are in position so that the localized magnetic fields produced by said electrical current flow therethrough will be mutually compressed.

19. Apparatus as claimed in claim 18 wherein said first elongated electrical conductor comprises a plurality of elongated rectilinear strands extending along said surface of said mass parallel to each other and to said cylindrical axis of said mass and electrically interconnected in series with each other in sinuous fashion; said second elongated electrical conductor comprises a plurality of elongated rectilinear strands parallel to each other and to said cylindrical axis of said mass and electrically interconnected in series with each other in sinuous fashion; said means for electrically connecting one end of said first elongated electrical conductor to one end of said second elongated electrical conductor comprises a first rotary brush means mounted for rotation with said mass; and said means for electrically connecting said given load across the other ends of said first and second electrical conductors comprises a second rotary brush means mounted for rotation with said mass.

20. Apparatus for converting inertial mechanical energy into a pulse of direct current electrical energy in a given load comprising:
(a) a solid mass having an exterior surface defining a right circular cylinder of given diameter and given length mounted for rotation about its cylindrical axis;
(b) an annular mass having an internal surface defining a right circular cylinder of slightly larger diameter than said given diameter of said solid mass mounted coaxially with said solid mass and overlapping the length thereof;
(c) electrical conductor means adapted to produce a plurality of equally spaced localized magnetic fields about said exterior surface of said solid mass by electrical current flow therethrough said electrical conductor means being mounted on one of said exterior surface of said solid mass and said interior surface of said annular mass;
(d) a plurality of equally spaced localized flux compression means mounted about the other of said exterior surface of said solid mass and said interior surface of said annular mass;
(e) means electrically connecting said load across said electrical conductor means;
(f) means for establishing an electrical current flow through said load and said electrical conductor means when said solid mass is in a first rotational position with respect to said annular mass, and
(g) means for electrically connecting an impedance in parallel with said load when said solid mass is in a second rotational position with respect to said annular mass.

21. Apparatus as claimed in claim 20 wherein said solid mass and said annular mass are each made of magnetic material, said external surface of said solid mass and said internal surface of said annular mass are each provided with a plurality of rectilinear grooves in parallel equal spaced array with each groove extending parallel to the cylindrical axis of the solid mass; and said electrical conductor comprises a plurality of elongated rectilinear strands electrically connected in series in sinuous fashion with each strand insulatingly received in a sufficient groove of one of said arrays of grooves in said external surface of said solid mass and said internal surface of said annular mass, whereby each said strand provides one of said plurality of localized magnetic fields, and each said groove in the other of said arrays of grooves provides one of said plurality of localized magnetic flux compression means.

22. Apparatus as claimed in claim 20 wherein said solid mass and said annular mass are each made of nonmagnetic material; said electrical conductor means comprises a plurality of elongated rectilinear strands electrically connected in series in sinuous fashion rigidly mounted to one of said external surface of said solid mass and said internal surface of said annular mass with each said strand extending parallel to said cylindrical axis of said solid mass and providing one of said plurality of localized magnetic fields upon electrical current flow therethrough; and said plurality of localized flux compression means comprises a plurality of elongated rectilinear electrically conductive strands electrically connected in series in sinuous fashion rigidly mounted to the other of said external surface of said solid mass and said internal surface of said annular mass with each said strand extending parallel to said cylindrical axis of said solid mass and providing one of said plurality of localized flux compression means upon electrical current flow therethrough.

23. Apparatus as claimed in claim 22 wherein said series connected strands of said electrical conductor means and said series connected electrically conductive strands providing said plurality of localized flux compression means are electrically connected in series with each other and said given load is electrically connected thereacross.

24. Apparatus as claimed in claim 20 wherein said annular mass is mounted for rotation about the cylindrical axis of the internal surface thereof.

25. Apparatus as claimed in claim 23 wherein each of said plurality of strands of said electrical conductor means comprises a plurality of elongated rectilinear conductive elements in close spaced substantially planar array having substantial width in relation to the thickness thereof and each of said electrically conductive strands providing said plurality of localized flux compression means comprises a plurality of elongated rectilinear conductive elements in close spaced mutually insulated substantially planar array having substantial width in relation to the thickness thereof.

26. Apparatus as claimed in claim 25 wherein said elongated rectilinear conductive elements of each of said strands of said electrical conductor means and of each of said electrically conductive strands providing said plurality of localized flux compression means are electrically insulated from each other along the length thereof.

27. Apparatus as claimed in claim 24 wherein said solid mass is mounted for rotation on said annular mass by means of resiliently mounted mechanical bearings and a hydrostatic bearing is provided by means of pressurized air between the exterior surface of said solid mass and the internal surface of said annular mass.

28. Apparatus as claimed in claim 27 wherein said load comprises a plurality of flashlamps electrically connected in parallel with each other and said means for establishing an electrical current flow through said load comprises a source of voltage high enough to initiate a discharge in said flashlamps.

29. Apparatus as claimed in claim 28 wherein said means for establishing an electrical current flow through said load comprises means for sensing the pressure of said hydrostatic bearing, and means for sensing the relative rotational positions of said solid mass and said annular mass.

30. Apparatus as claimed in claim 29 wherein said means for electrically connecting an impedance in parallel with said load includes means for sensing the voltage across said load.

31. The method of converting a substantial portion of the inertial mechanical energy stored in a mass rotating about a given axis and having a surface defining a right circular cylinder into a single pulse of electrical energy in a given load comprising the steps of:
   (a) providing an electrical conductor means adapted to produce a plurality of localized magnetic fields in right circular cylindrical array about said surface of said rotating mass and having centers spaced a given distance from each other in said array upon flow of electrical current therethrough;
   (b) providing a right circular cylindrical array of a plurality of localized magnetic flux compression means about said surface of said rotating mass having centers spaced said given distance from each other in said array;
   (c) mounting one of said electrical conductor means and said array of a plurality of localized magnetic flux compression means on said mass for rotation therewith and mounting the other against rotation with said mass;
   (d) electrically connecting said given load across said electrical conductor means;
   (e) initially rotating said mass without electrical current flow through said electrical conductor means;
   (f) sensing the position of said array of localized flux compression means relative to said plurality of localized magnetic fields; and
   (g) establishing an electrical current flow in a given direction through said electrical conductor means and said given load when each of said localized magnetic flux compression means is in position to begin compressing the flux of a different one of said plurality of magnetic fields produced by said electrical current flow through said electrical conductor means.

32. The method of converting inertial mechanical energy into a direct current pulse of electrical energy in a given load comprising the steps of:
   (a) rotating a mass about a given axis to provide a source of inertial mechanical energy;
   (b) providing an elongated electrical conductor means at a surface of said rotating mass adapted to produce a localized magnetic field upon passage of electrical current from one end thereof to the other end thereof;
   (c) providing a localized magnetic flux compression means at said surface of said rotating mass;
   (d) rotating one of said elongated electrical conductor means and said localized magnetic flux compression means with said surface of said mass to periodically compress the flux of a magnetic field produced by electrical current flow through said electrical conductor means;
   (e) establishing an electrical voltage difference between opposite ends of said electrical conductor means; and
   (f) establishing an electrical current flow through said load and said electrical conductor means by matching the impedance of said load to said electrical conductor means when said flux compression means is in position relative to said electrical conductor means to begin compressing the flux of the magnetic field produced by said electrical current flow.

33. The method of converting inertial mechanical energy into a pulse of direct current electrical energy in a given load comprising the steps of:
   (a) rotating a mass having a right circular cylindrical surface about a given axis;
   (b) providing a first elongated electrical conductor means rigidly fixed to said surfce of said mass and electrically insulated therefrom to produce a first plurality of localized magnetic fields spaced a given angular distance from each other in right circular cylindrical array about said surface of said mass upon flow of electrical current therethrough;
   (c) providing a second elongated electrical conductor mounted in close spaced relation to said surface of said rotating mass against rotation therewith and insulated therefrom to produce a second plurality of localized magnetic fields upon electrical current flow therethrough spaced said given angular distance from each other in right circular cylindrical array about said surface of said mass;
   (d) electrically connecting said given load across at least one of said first and second electrical conductors;
   (e) sensing the relative position of said first plurality of localized magnetic fields with respect to said second plurality of localized magnetic fields; and
   (f) establishing an electrical current through said first and said second elongated electrical conductors and said load when said first and second electrical conductors are in position so that the localized magnetic fields produced by said electrical current flow therethrough will be mutually compressed.

34. Apparatus for converting a substantial portion of the inertial mechanical energy stored in a mass rotating about a given axis and having a surface defining a right circular cylinder into a single pulse of electrical energy in a given load comprising;
   (a) an electrical conductor means adapted to produce a plurality of localized magnetic fields in right circular array about said surface of said rotating mass and having centers spaced a given distance from each other in said array upon flow of electrical current therethrough;
   (b) a right circular cylindrical array of a plurality of localized magnetic flux compression means about said surface of said rotating mass having centers spaced by substantially said given distance from each other in said array; one of said electrical conductor means and said array of a plurality of localized magnetic flux compression means being mounted on said mass for rotation therewith and the other being mounted to oppose rotation with said mass;
   (c) means for electrically connecting said given load across said electrical conductor means; and
   (d) means for establishing an electrical current flow in a given direction through said electrical conductor means and said given load when each of said localized magnetic flux compression means is in position to begin compressing the flux of a different one of said plurality of magnetic fields produced by said electrical current flow.

35. Apparatus for converting inertial mechanical energy into a pulse of direct current electrical energy in a given load comprising:
(a) a mass having a right circular cylindrical surface mounted for rotation about its cylindrical axis;
(b) a first elongated electrical conductor rigidly fixed to said surface of said mass and electrically insulated therefrom to produce a first plurality of localized magnetic fields spaced a given angular distance from each other in right circular cylindrical array about said surface of said mass upon flow of electrical current therethrough;
(c) a second elongated electrical conductor mounted in close spaced relation to said surface of said rotating mass against rotation therewith and insulated therefrom to produce a second plurality of localized magnetic fields upon electrical current flow therethrough spaced substantially said given angular distance from each other in right circular cylindrical array about said surface of said mass;
(d) means for electrically connecting said given load across at least one of said first and second electrical conductors,
(e) means for establishing an electrical current flow through said load and said first and second elongated conductors when said first and second electrical conductors are in position so that the localized magnetic fields produced by said electrical current flow therethrough will be mutually compressed.

36. Apparatus for converting inertial mechanical energy into a pulse of direct current electrical energy in a given load comprising:
(a) a first mass having maximum exterior surface portions defining a right circular cylinder of given diameter and given length mounted for rotation about its cylindrical axis;
(b) an annular mass having an internal surface defining a right circular cylinder of slightly larger diameter than said given diameter of said right circular cylinder defined by said first mass mounted coaxially with said first mass and overlapping the length thereof;
(c) electrical conductor means adapted to produce a plurality of equally spaced localized magnetic fields about said right circular cylinder of said first mass by electrical current flow therethrough said electrical conductor means being mounted on one of said maximum exterior surface portions of said first mass and said interior surface of said annular mass;
(d) a plurality of equally spaced localized flux compression means mounted about the other of said maximum exterior surface portions of said first mass and said interior surface of said annular mass;
(e) means electrically connecting said load across said electrical conductor means; and
(f) means for establishing an electrical current flow through said load and said electrical conductor means when said first mass is in a given rotational position with respect to said annular mass, 37. Apparatus as claimed in claim 36 wherein said first mass and said annular mass are each made of non-magnetic material; said electrical conductor means comprises a plurality of elongated rectilinear strands electrically connected in series in sinuous fashion rigidly mounted to one of said maximum external surface portions of said first mass and said internal surface of said annular mass with each said strand extending parallel to said cylindrical axis of said first mass and providing one of said plurality of localized magnetic fields upon electrical current flow therethrough; and said plurality of localized flux compression means comprises a plurality of elongated rectilinear electrically conductive strands electrically connected in series in sinuous fashion rigidly mounted to the other of said maximum external surface portions of said first mass and said internal surface of said annular mass with each strand extending parallel to said cylindrical axis of said first mass and providing one of said plurality of localized flux compression means upon electrical current flow therethrough.

38. Apparatus as claimed in claim 36 wherein said annular mass is mounted for rotation about the cylindrical axis of the internal surface thereof.

39. Apparatus as claimed in claim 37 wherein each of said plurality of strands of said electrical conductor means comprises a plurality of elongated rectilinear conductive elements in close spaced substantially planar array having substantial width in relation to the thickness thereof and each of said electrically conductive strands providing said plurality of localized flux compression means has substantial width in relation to the thickness thereof.

40. Apparatus as claimed in claim 39 wherein said elongated rectilinear conductive elements of each of said strands of said electrical conductor means are electrically insulated from each other along the length thereof.

41. Apparatus as claimed in claim 36 wherein said load comprises a plurality of flashlamps electrically connected in parallel with each other and said means for establishing an electrical current flow through said load comprises a source of voltage high enough to initiate a discharge in said flashlamps.

* * * * *

UNITED STATES PATENT AND TRADEMARK OFFICE
CERTIFICATE OF CORRECTION

PATENT NO. : 4,266,180

DATED : May 5, 1981

INVENTOR(S) : CHRISTIAN H. A. JUVAN

It is certified that error appears in the above—identified patent and that said Letters Patent is hereby corrected as shown below:

Column 11, line 36 - delete "is".

Column 20, line 4 - delete "sufficient" and substitute --different-- therefor.

Column 22, line 18 - change "surfce" to --surface--.

Signed and Sealed this

Eighteenth Day of August 1981

[SEAL]

Attest:

Attesting Officer

GERALD J. MOSSINGHOFF

Commissioner of Patents and Trademarks